United States Patent [19]

Talley

[11] Patent Number: 4,593,058

[45] Date of Patent: Jun. 3, 1986

[54] FLAME RETARDANT POLYPHENYLENE OXIDE THERMOPLASTICS

[75] Inventor: John J. Talley, Clifton Park, N.Y.

[73] Assignee: General Electric Company, Schenectady, N.Y.

[21] Appl. No.: 651,542

[22] Filed: Sep. 17, 1984

[51] Int. Cl.$^4$ ............................ C08K 5/49; C08K 5/51
[52] U.S. Cl. .................................. 524/122; 524/137; 525/68; 525/905
[58] Field of Search ................ 524/122, 137; 525/68, 525/905

[56] References Cited

U.S. PATENT DOCUMENTS

| | | | |
|---|---|---|---|
| 3,383,435 | 5/1968 | Ezek | 525/905 |
| 3,755,250 | 8/1973 | Wollensak et al. | 524/137 |
| 3,929,931 | 12/1975 | Izawa et al. | 525/905 |
| 3,943,191 | 3/1976 | Cooper et al. | 525/905 |

*Primary Examiner*—Jacob Ziegler
*Attorney, Agent, or Firm*—William A. Teoli; James C. Davis, Jr.; James Magee, Jr.

[57] ABSTRACT

Flame retardant blends of polyphenylene oxide and styrene resin are provided as a result of the use of a minor amount of a triorganothiophosphate.

6 Claims, No Drawings

FLAME RETARDANT POLYPHENYLENE OXIDE THERMOPLASTICS

CROSS REFERENCE TO RELATED APPLICATIONS

Reference is made to my copending application Ser. No. 651,543, filed Sept. 17, 1984, for Flame Retardant Polyphenylene Oxide Thermoplastics, filed concurrently herewith and assigned to the same assignee as the present invention.

BACKGROUND OF THE INVENTION

Prior to the present invention as shown by Cizek U.S. Pat. No. 3,383,435, assigned to the same assignee as the present invention and incorporated herein by reference, thermoplastic resin compositions were provided comprising a polyphenylene ether and a styrene resin. Other thermoplastic compositions are shown by Izawa et al., U.S. Pat. Nos. 3,929,930 and 3,929,931, incorporated herein by reference, which are polyphenylene ether having polystyrene grafted onto the backbone. Although these materials in the form of shaped articles have high impact strength, stiffness, good surface appearance, heat resistance and other desirable properties during or after molding, a major shortcoming of these materials as thermoplastics resins is their normally flammable nature. As a result, flame retardant and/or drip retardant agents are commonly incorporated into such blends of polyphenylene ethers and styrene resin prior to molding.

The flammability of normally flammable thermoplastic polymers have been reduced by using antimony-, halogen-, phosphorous- or nitrogen-containing additives commonly referred to as flame retardant agents. For example, aromatic phosphates such as triphenylphosphate or a combination of such compounds with other compounds such as halogenated aromatics have been added as flame retardant agents as shown by Haas, U.S. Pat. No. 3,639,506. Experience has shown, however, that although these phosphate compounds have been found to impart good flame resistant properties to such polyphenylene ether thermoplastic blends, physical properties of the molded blends such as the heat distortion temperature (HDT) are often adversely affected.

The present invention is based on the discovery that the addition of small amount of organothiophosphate, for example, a triarylthiophosphate to polyphenylene oxide-polystyrene resin blends or grafted copolymers as previously defined to provide up to 5% by weight of phosphorous, has been found to significantly reduce the flammability of the resulting molded thermoplastic materials. In addition, while imparting improved flame retardant properties to polyphenylene oxide-polystyrene blends, the organothiophosphates used in the present invention have been found to have significantly less affect on the HDT of such blends.

STATEMENT OF THE INVENTION

There is provided by the present invention flame retardant thermoplastic selected from the class consisting of blends and grafted copolymers comprising by weight
(A) 100 parts of polyphenylene oxide
(B) 20 to 300 parts of styrene resin and
(C) an effective amount of an organothiophosphate having the formula

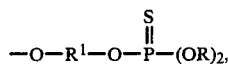
(1)

where R is a $C_{(1-13)}$ monovalent hydrocarbon radical or substituted $C_{(1-13)}$ monovalent hydrocarbon radical, Q is a monovalent group selected from —OR and

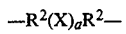

and $R^1$ is selected from divalent $C_{(2-20)}$ hydrocarbon radicals and substituted divalent $C_{(2-20)}$ hydrocarbon radicals.

Radicals included within R of formula (1) are, for example, $C_{(1-8)}$ alkyl radicals such as methyl, ethyl, propyl, butyl, pentyl, hexyl, etc.; $C_{(6-13)}$ aryl radicals such as phenyl, tolyl, xylyl, naphthyl, and $C_{(1-8)}$ alkoxy and halogenated derivatives of such aryl radicals. Radicals included within $R^1$ are, for example, alkylene radicals such as dimethylene, trimethylene, tetramethylene, hexamethylene and branched alkylene radicals; arylene radicals such as phenylene, toluene, xylylene, and divalent radicals having the formula $$-R^2(X)_aR^2-$$

where $R^2$ is a divalent $C_{(6-13)}$ arylene radical, X is a divalent radical selected from O, S and $C_yH_{2y}$, y is a whole number from 1 to 5 inclusive, and a is 0 or 1.

Some of the organothiophosphates which are included within formula (1) are, for example, triphenyl thiophosphate, tri o-cresyl thiophosphate, tri m-cresyl thiophosphate, tri p-cresyl thiophosphate, trixylyl thiophosphates, tris-trimethylphenyl thiophosphates, trimethyl thiophosphate, tripropyl thiophosphate, phenyldimethyl thiophosphate, tri-p-chlorophenyl thiophosphate and the like.

As used hereinafter, the expression "effective amount of organothiophosphate of formula (1)" is that amount which is sufficient to provide from 0.5% to 5% by weight of phosphorous based on the weight of the flame retardant polyphenylene oxide blend.

The polyphenylene ether or polyphenylene oxide resin which can be used in the practice of the present invention is shown by the following formula

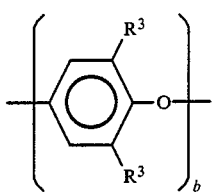
(2)

where $R^3$ is a monovalent radical selected from the class consisting of hydrogen, halogen, hydrocarbon radicals free of a tertiary α-carbon atom, halogenated hydrocarbon radicals having at least two carbon atoms between the halogen atom and the phenyl nucleus, hydrocarbonoxy radicals and halogenated hydrocarbonxy radicals having at least two carbon atoms between the halogen atom and the phenyl and b is an integer having a value of at least 50.

A more preferred class of polyphenylene ether resins for the composition of the present invention include those of formula (2) where $R^3$ is alkyl and, most preferably, having from 1 to 4 carbon atoms. Illustratively, members of this class include poly(2,6-dimethyl-1,4-phenylene)ether; poly(2,6-diethyl-1,4-phenylene)ether; poly(2-methyl-6-ethyl,4-phenylene)ether; poly(2-methyl-6-propyl-1,4-phenylene)ether; poly(2,6-dipropyl-1,4-phenylene)ether; poly(2-ethyl6-propyl-1,4-phenylene)ether; and the like.

Especially preferred is poly(2,6-dimethyl-1,4-phenylene)ether, preferably, having an intrinsic viscosity of about 0.45 deciliters per gram (dl./g.) as measured in chloroform at 30° C.

The preparation of the polyphenylene ether resins is described in Hay, U.S. Pat. No. 3,306,874 and 3,306,875 and in Stamatoff, U.S. Pat. Nos. 3,257,357 and 3,257,358, which are incorporated herein by reference.

The preferred styrene resins will be those having at least 25% by weight of repeating units derived from a vinyl aromatic compound of the formula:

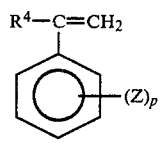

where $R^4$ is selected from hydrogen, $C_{(1-5)}$ alkyl and halogen, Z is selected from vinyl, hydrogen, halogen and $C_{(1-8)}$ alkyl, and p is a whole number equal to 0 to 5 inclusive.

The term "styrene resins" is used broadly to define components fully described in Cizek, U.S. Pat. No. 3,383,435, the disclosure of which is incorporated herein by reference Such resins include homopolymers, such as polystyrene, polychlorostyrene and polyvinyl toluene, the modified polystyrenes such as rubber modified polystyrene blended or grafted high impact products, e.g., the rubber being a polybutadiene or an elastomeric copolymer of styrene and a diene monomer. Also included are styrene containing copolymers, such as styrene-acrylonitrile copolymers (SAN), styrene-butadiene copolymers, styrene-acrylonitrilebutadiene terpolymers (ABS), styrene-maleic anhydride copolymers, polyalpha-methylstyrene, copolymers of ethyl vinyl benzene and divinylbenzene, and the like. In instances where the method of Izawa et al. is used to make thermoplastic materials, U.S. Pat. Nos. 3,929,930 and 3,929,931, polyphenylene oxide is heated with a styrene monomer shown by formula 3 in the presence of a free radical initiator resulting in a graft polyphenylene ether polystyrene copolymer.

Special mention is made of a preferred class of styrene containing resins. These are known as "HIPS" resins, for high impact polystyrene, in which the impact modifier comprises one or more of an ethylene/propylene/diene terpolymer, or a hydrogenated derivative, a vinyl-aromatic/diene block copolymer resin, or a hydrogenated derivative, a hydrogen saturated vinylaromatic/diene random copolymer, a radial teleblock copolymer of a vinyl aromatic compound and a diene, a vinyl aromatic/methacrylic or acrylic acid or ester/diene terpolymer, and the like. These specialty HIPS resins are commercially available or can be prepared by those skilled in this art.

The compositions of the invention can also further include reinforcing agents, preferably fibrous glass reinforcements, alone or in combination with non-glass reinforcing fillers. The fibrous glass is especially preferably fibrous glass filaments comprised of lime-aluminum borosilicate glass which is relatively soda free, known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcements comprise from about 1 to about 80% by weight based on the combined weight of glass and polymers and preferably, from about 10 to about 50% by weight. Especially preferable, the glass will comprise from about 10 to about 40% by weight based on the combined weight of glass and resin. Generally, for direct molding use, up to about 50% of glass can be present without causing flow problems. However, it is useful also to prepare the compositions containing substantially greater quantities, e.g., up to 70 to 80% by weight of glass. These concentrates can then by custom blended with blends of resins that are not glass reinforced to provide any desired glass content of a lower value.

Other ingredients, such as stabilizers, pigments, plasticizers, antioxidants, and the like, can be added for their conventionally employed purposes.

The manner in which the present compositions are prepared is not critical and conventional methods can be employed. Preferably, however, each of the ingredients is added as part of a blend premix, and the latter is passed through an extruder, e.g., a 28 mm. WP twin screw extruder, at an extrusion temperature of from about 500° to about 600° F., dependent on the needs of the particular composition. The strands emerging from the extruder may be cooled, chopped into pellets and molded to any desired shape.

In order to allow those skilled in the art to better practice the present invention, the following example is given by way of illustration and not by way of limitation. All parts are by weight.

EXAMPLE 1

A mixture of 280 grams of 2,4-dimethylphenol and 89 grams of phosphorous trichloride was stirred at room temperature for 2 hours under a nitrogen atmosphere and then heated to 100° C. for an additional 2 hours. The mixture immediately began to evolve hydrogen chloride. Excess 2,4-dimethylphenol was removed by vacuum distillation. The residue was vacuum distilled resulting in 220.5 grams of a clear liquid having a boiling point of 195°–200° C. at 0.5 torr. Based on method of preparation and its NMR and IR spectra, the product was tris-2,4-dimethylphenylphosphite.

A mixture of 1000 grams of the tris-2,4-dimethylphenylphosphite and 81.2 grams of sulfur was heated to 150° C. resulting in an exothermic reaction and the temperature rapidly increased to 220° C. The mixture was then cooled to room temperature and the resulting product was vacuum distilled. There was obtained 902 grams or a 83% yield of a white solid having a melting point of 65° C. Based on method of preparation and its melting point and IR and NMR spectra, the product was tris-2,4-dimethylphenylthiophosphate.

A blend of 400 grams of poly(2,6-dimethyl-1,4-phenylene)ether having an intrinsic viscosity of about 0.45 deciliters per gram (dl/g) as measured in chloroform at 30° C., 600 grams of Foster Grant high impact polystyrene pellets, and 159.3 grams of tris-2,4dimethylphenyl thiophosphate were added to a Henchel mixer and thoroughly mixed for 5 minutes. The mixture was then extruded at 300° C. using a Werner and Pfleiderer extruder. The resulting resin strands were then chopped into ⅛ inch × ⅛ inch pellets which were molded into 5 inch × ½ inch × ⅛ inch bars in accordance with Underwriter's Laboratories Bulletin No. 94.

The flammability characteristics of these bars were tested in accordance with the procedure outlined in UL Bulletin No. 94. The bars were found to be non-dripping and self-extinguishing. The average flame-out time (FOT) and the heat distortion temperature (HDT) in accordance with ASTM D-648-56 was determined. The same procedure was repeated for evaluating additional samples of thiophosphate containing polyphenylene oxide-styrene blends. In addition, blends were also evaluated free of flame retardant, and a blend was also evaluated containing 16.0 parts of triphenylphosphate in place of the 15.9 parts of the tris-2,4-dimethylphenylthiophosphate. The following results were obtained where FOT is measured in seconds and HDT is measured in °F.

| Flame Retardant | FOT (sec) | hdt (°F.) |
| --- | --- | --- |
| none | burns | 237 |
| (PhO)₃P=O | 5.2 | 162.1 |
| (PhO)₃P=S | 3.6 | 173.1 |
| (2-MeC₆H₄O)₃P=S | 3.1 | 166.6 |
| (3-MeC₆H₄O)₃P=S | 4.0 | 172.6 |
| (4-MeC₆H₄O)₃P=S | 2.5 | 167.0 |
| (2,4-Me₂C₆H₃O)₃P=S | 2.1 | 167.1 |
| 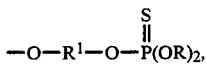 | 4.5 | 186.9 |

The above results show that the arylthiophosphates of the present invention impart superior flame retardant properties to polyphenylene oxide-polystyrene blends while having substantially less affect on the heat distortion temperature of such blends as compared to triphenylphosphate.

Although the above example is directed to only a few of the very many variables which can be utilized in the practice of the present invention, it should be understood that the present invention is concerned with the use of a much broader variety of organothiophosphates as shown by formula (1) as well as the use of such materials in combination with polyarylene oxides and vinyl aromatic resins as shown in the description preceding this example.

What is claimed is:

1. A flame retardant thermoplastic comprising by weight
   (A) 100 parts of polyphenylene oxide,
   (B) 20 to 300 parts of styrene resin and
   (C) sufficient organothiophosphate of the formula $$(RO)_2\overset{S}{\underset{\|}{P}}-Q$$

to provide from 0.5% to 5% by weight of phosphorus based on the weight of flame retardant thermoplastic where R is a $C_{(1-13)}$ monovalent hydrocarbon radical or substituted $C_{(1-13)}$ monovalent hydrocarbon radical, and Q is a monovalent group selected from the class consisting of —OR and $$-O-R^1-O-\overset{S}{\underset{\|}{P}}(OR)_2,$$

$R^1$ is selected from the class consisting of divalent $C_{(2-20)}$ hydrocarbon radicals, halogenated divalent $C_{(2-20)}$ hydrocarbon radicals and divalent radicals having the formula $$-R^2(X)_aR^2-$$

where $R^2$ is a divalent $C_{(6-13)}$ arylene radical, X is a divalent radical selected from O, S, and $C_yH_{2y}$, y is a whole number from 1 to 5 inclusive and a is 0 or 1.

2. A flame retardant composition comprising a polyphenylene oxide-polystyrene graft copolymer and the amount of the organothiophosphate in accordance with claim 1.

3. A composition in accordance with claim 1 where the organothiophosphate is tri-4-methylphenylthiophosphate.

4. A composition in accordance with claim 1 where the organothiophosphate is tri-3-methylphenylthiophosphate.

5. A composition in accordance with claim 1 where the organothiophosphate is tri-2-methylphenylthiophosphate.

6. A composition in accordance with claim 1 where the organothiophosphate is tri-2,4-dimethylphenylthiophosphate.

* * * * *